(No Model.)
E. L. DOYEN.
FLEXIBLE SHAFT.
No. 564,875.  Patented July 28, 1896.
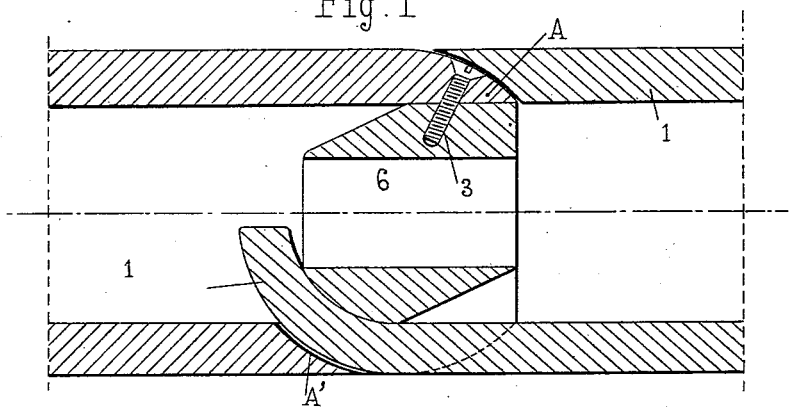
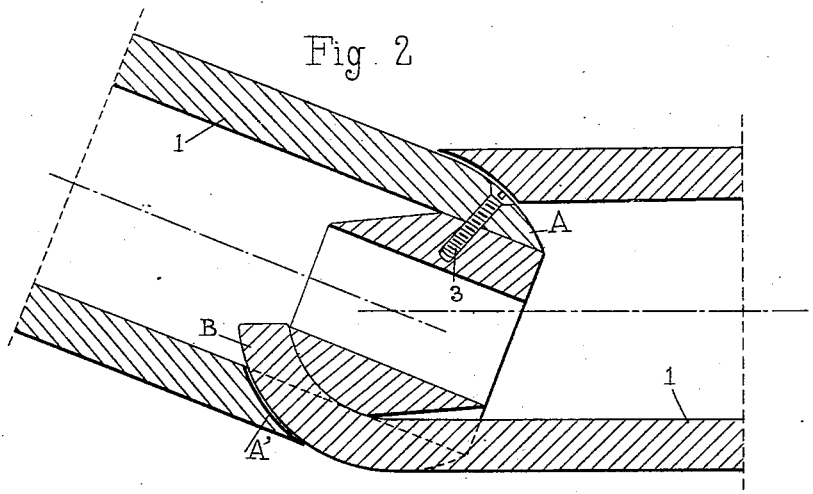
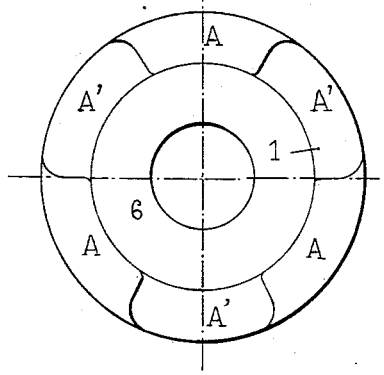
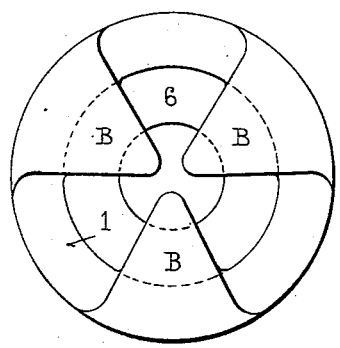
Witnesses
Thos. A. Green
Robert Everett
Inventor
Eugene Louis Doyen
By James L. Norris
Atty.

UNITED STATES PATENT OFFICE.

EUGÈNE LOUIS DOYEN, OF RHEIMS, FRANCE.

FLEXIBLE SHAFT.

SPECIFICATION forming part of Letters Patent No. 564,875, dated July 28, 1896.

Application filed May 8, 1896. Serial No. 590,755. (No model.)

*To all whom it may concern:*

Be it known that I, EUGÈNE LOUIS DOYEN, a citizen of France, and a resident of Rheims, France, have invented a new and useful Flexible Shaft, of which the following is a specification.

My invention relates to flexible transmission-shafts.

According to my invention the shaft is formed of tubular component lengths articulated together, as hereinafter described with reference to the accompanying drawings.

Figures 1 and 2 show in longitudinal section portions of two adjacent lengths of shafting with the ends joined together according to this invention, Fig. 1 showing the lengths in line and Fig. 2 showing them angled relatively to each other. Figs. 3 and 4 show in end views each of the two ends of the lengths so connected.

The component lengths each consist of tubes 1, formed at their extremities so that of the two ends of adjacent lengths which are joined together the one, A, is formed with an end having recesses A', (say three,) which engage with a similar number of claws B, carried by the opposed end of the next length, the outer and inner surfaces of these claws being curved spherically and corresponding exteriorly to the spherically-curved recesses A' at the end of the opposed length.

The ends are engaged together so as to cause the claws of the one to engage with the recesses in the other, and they are secured in position by fixing or forming in the end A an internal tubular piece 6, formed at its inner end with spherically-curved parts corresponding to the interiors of the claws and being struck from a radius the same as that of the interior of the tubular length in which it is fitted. The said piece 6 is shown as being secured by screws, as at 3, but it may be secured in any other way. These spherical curved parts bear against the corresponding internal surfaces of the claws on the other length, so that while the lengths 1 can be moved angularly in any direction they are laterally secured together and held in position relatively to each other for transmission of the driving power.

The component parts can be introduced into or covered by a woven sheath or other suitable envelop.

I claim—

A flexible shaft composed of tubular lengths with ends provided with reversely-disposed spherical surfaces engaging together there being claws such as B on the one end engaging with a piece such as 6 in the other end substantially as hereinbefore described and illustrated.

In testimony whereof I have signed this specification in the presence of two subscribing witnesses.

EUGÈNE LOUIS DOYEN.

Witnesses:
 CLYDE SHROPSHIRE,
 W. LONG.